United States Patent [19]
Sandorfi

[11] Patent Number: 5,706,298
[45] Date of Patent: Jan. 6, 1998

[54] METHOD AND APPARATUS FOR CALCULATING THE LONGITUDINAL REDUNDANCY CHECK IN A MIXED STREAM CHANNEL

[75] Inventor: Miklos A. Sandorfi, Foxboro, Mass.

[73] Assignee: EMC Corporation, Hopkinton, Mass.

[21] Appl. No.: 556,109

[22] Filed: Nov. 9, 1995

[51] Int. Cl.$^6$ ................................. G06F 11/00
[52] U.S. Cl. ................ 371/53; 371/37.1; 371/67.1; 364/265.1; 364/266.3
[58] Field of Search ................ 371/53.1, 67.1, 371/68.2, 71, 34, 35, 25.1, 20.1, 20.4, 37.1, 49.2, 49.1; 395/182.16; 364/265.1, 266.3, 266.4, 944.5

[56] References Cited

U.S. PATENT DOCUMENTS

| | | | |
|---|---|---|---|
| 3,699,516 | 10/1972 | Mecklenburg | 371/37.1 |
| 4,346,474 | 8/1982 | Sze | 371/49 |
| 4,363,125 | 12/1982 | Brewer et al. | 371/71 |
| 4,688,225 | 8/1987 | Fukami et al. | 371/37 |
| 4,768,197 | 8/1988 | Petolino et al. | 371/38 |
| 4,791,642 | 12/1988 | Taylor et al. | 371/38 |
| 4,996,690 | 2/1991 | George et al. | 371/37.1 |
| 5,285,456 | 2/1994 | Cheney et al. | 371/49.1 |
| 5,452,429 | 9/1995 | Fuoco et al. | 395/182.04 |
| 5,499,337 | 3/1996 | Gordon | 395/182.04 |

*Primary Examiner*—Robert W. Beausoliel, Jr.
*Assistant Examiner*—Trinh L. Tu
*Attorney, Agent, or Firm*—Fish & Richardson P.C.

[57] ABSTRACT

The invention relates to a method and apparatus for checking data integrity in a data communications system in which plural data streams can be intermixed and wherein the data streams have a frame transmission format in which the frame is different than the logical block length of the data stream components. The integrity of the transmission process is checked without requiring system processor involvement, unless errors are detected. A first incoming data stream, composed of logical blocks, is received; and a running longitudinal redundancy check is calculated. If the data stream is interrupted at other than the end of a block, the intermediate value of the LRC is stored in a context storage associated only with that data stream. When the data stream continues, and this may occur after other data streams have been received, the intermediate value of the LRC is recalled from the context storage and the running longitudinal redundancy check calculation is continued. The storage and calculation steps continue each time the data stream is interrupted other than at a logical termination of a logical block for the data stream. The communications process is particularly applicable to mass storage subsystems in which the data streams are directed to and from the storage media.

14 Claims, 4 Drawing Sheets

METHOD AND APPARATUS FOR CALCULATING THE LONGITUDINAL REDUNDANCY CHECK IN A MIXED STREAM CHANNEL

BACKGROUND OF THE INVENTION

The invention relates generally to a method and apparatus for checking data integrity of a data communications and/or storage system, and more particularly, to a method and apparatus providing a longitudinal redundancy check in a communications and/or storage subsystem in which plural data streams can be intermixed.

In a data communications environment, the reliability and integrity of the data, as it is communicated from location to location, or when stored in a mass storage device for later retrieval, are of primary importance. In a typical system environment, a longitudinal redundancy check (LRC) is often used to check the data integrity. Generally, a fixed size block of data will have a bit-wise EXCLUSIVE-OR calculation performed on each "word" of the data which forms the block, and then the result of the EXCLUSIVE-OR calculation is appended at the end of the block. The resulting EXCLUSIVE-OR calculation is referred to as the longitudinal redundancy check (LRC).

In a systems environment, such as a disk subsystem, when a data stream is accepted from a host, for example during a host initiated write operation, the LRC calculation is performed and appended to each received data block. The resulting data block is then stored by the subsystem. As the data passes through the subsystem (for example through a solid state cache, and as it is being stored in the storage media) the LRC calculation is carried with the data. Further, when the host later requests the data, the data block is fetched along with the LRC previously calculated, and as the data is transferred to the host, the same LRC EXCLUSIVE-OR calculation is performed on the read data block, and compared with the stored LRC value. If the newly calculated value and the stored LRC value match, then the data is presumed to be valid. Otherwise, there is an error or corruption in the data block and an error recovery procedure can be invoked.

In a straightforward, simple, block-oriented data transfer device, such as parallel SCSI-2 or parallel IPI-3, the smallest unit of data transfer is designated the "block". It is the block to which the longitudinal redundancy check is typically appended. However, with the advent of serial transmission protocols, including the fibre channel, the unit of data transfer, the "frame", is not necessarily the same as the logical block size. This presents a problem in performing the LRC calculation since the calculation is not meaningful unless it is performed on the entire logical data block. In the fibre channel protocol, for example, a varying number of data bytes per fibre channel frame is permitted, and the frames may be intermixed with other data streams so that data blocks (or portions thereof) from many different transfers arrive simultaneously at the receiver. The link layer, according to the fibre channel protocol, places no constraints on the method of data transfer; and therefore, traditional LRC calculation apparatus may not be, and typically are not, useful.

Accordingly, therefore, a method and apparatus need to recognize that the traditional "block" may not be complete within a frame of input on, for example, the fibre channel, and therefore, a reliable system must provide some alternate method of determining the LRC, or, proceed in a manner typical today of not calculating the LRC where frames are intermixed with other data streams so that data blocks arrive simultaneously and in pieces.

SUMMARY OF THE INVENTION

The invention relates to a method and apparatus for checking data integrity in a data communications system in which plural data streams can be intermixed and wherein the data streams can have varying logical block lengths per frame. Preferably, no host microprocessor assistance is required according to the method and apparatus.

The method features the steps of receiving a first incoming data stream; determining a running longitudinal redundancy check for said received data stream as it is being received; and storing an intermediate value of said longitudinal redundancy check if the stream is interrupted prior to a logical termination of a logical block of the stream, said storing step being performed in a context storage associated only with the data stream. The method further features recognizing a continuation of the interrupted data stream; recalling the intermediate value of the LRC from the context storage associated with the interrupted data stream; continuing to determine the running longitudinal redundancy check for the received data stream using the recalled intermediate value; and repeating the above steps as necessary, if the received data stream is interrupted again prior to the logical termination of a logical block of the stream.

In particular aspects, the method features said data stream having a sequence of data blocks, each complete data block being a logical termination of the data stream. Certain methods further feature a sequence of frames having a fibre channel protocol, each frame consisting of a group of blocks and/or partial blocks, and further featuring the step of terminating a data stream from a first source at the end of a first frame wherein the storing step occurs if a block of the data stream continues after the end of the frame. In further aspects of the invention, the storing step further features the step of storing with the intermediate value, in the context storage, the number of frame words remaining in the frame, the number of words per block, and the number words remaining to fill the current block. The method may further feature matching a determined logical redundancy check at the end of the data stream with a previously determined logical redundancy check for the data stream, for example, when the data stream is being delivered from storage to a host computer.

The apparatus of the invention for checking the data integrity in a data communications system in which plural data streams can be intermixed features a data receiver for receiving a first incoming data stream; a data processor for determining a running longitudinal redundancy check for the received data stream as it is being received, a context storage associated only with the data stream for storing an intermediate value of the longitudinal redundancy check each time the stream is interrupted prior to a logical block termination within the stream; the data processor recognizing each continuation of the interrupted data stream and recalling the most recent intermediate value from the context storage associated with the interrupted data stream; and the data processor determining the running longitudinal redundancy check for the continued received data stream using the last recalled intermediate value.

BRIEF DESCRIPTION OF THE DRAWINGS

Other objects, features, and advantages of the invention will be apparent from the following description, taken together with the drawings in which.

DESCRIPTION OF A PREFERRED EMBODIMENT

Figure 1:
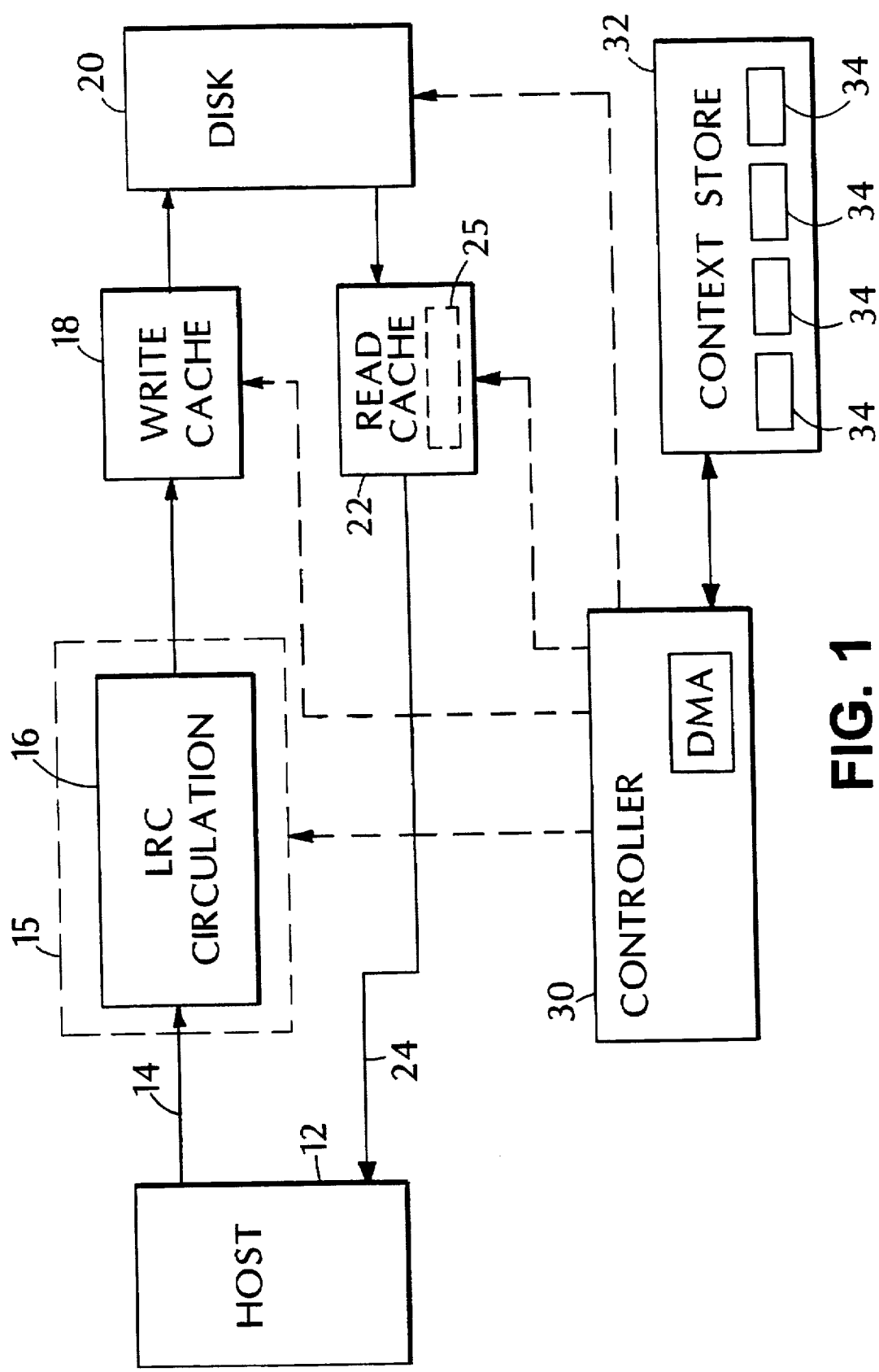
FIG. 1 is a schematic block diagram of a particular embodiment according to the invention.

Referring to FIG. 1, in an illustrated embodiment of the invention, a host computer 12 delivers, over a line 14, a data stream using a fibre channel protocol, to a storage subsystem having a fibre channel receiver 15. The receiver 15 includes circuitry 16 for adding to the data stream a longitudinal redundancy check calculation. In accordance with the fibre channel protocol, the data stream is composed of at least one frame, the frame(s) forming a sequence. The frames are each composed of a plurality of blocks. When the data stream enters the storage subsystem, a calculated LRC is appended to the end of each block of the data stream. The LRC calculation starts anew at the beginning of each block.

The data stream, with the LRC added, is then, in the illustrated embodiment, delivered to a write cache 18 for writing to a disk drive 20. When the host later requests the storage subsystem to read the stored information, the disk drive 20 delivers the information to a read cache 22 which in turn delivers it back to the host over the fibre channel protocol connection 24. At the read cache 22, there is preferably implemented an LRC checksum calculation, performed by LRC comparison circuit 25, to ensure that the data being read from disk is reliable and correct, and not corrupted or distorted.

Complexities are introduced into this process by the ability of the host to inject, for example over the fibre channel 14, both a multiplexing of frames (that is, successive frames which belong to different data streams) and the inclusion, if desired, within the frames, of data blocks of varying size and even belonging to different data streams. In particular, when the frame length is not an integer multiple of the data logical block size, the end of a frame can occur in the middle of a data block. Accordingly, the longitudinal redundancy check for the block will not have been completed and, therefore, in a typical system the longitudinal redundancy check has not even been included as one of the methods for checking the integrity of the system write/read operation.

While the specific embodiment described herein is applied to a fibre channel controller, the method is generally applicable and can be adapted to any type of link-layer protocol including fibre channel implementations other than that described herein or including other serial storage architectures (SSA). However for purposes of illustration, the fibre channel protocol shall be described.

Figure 2:
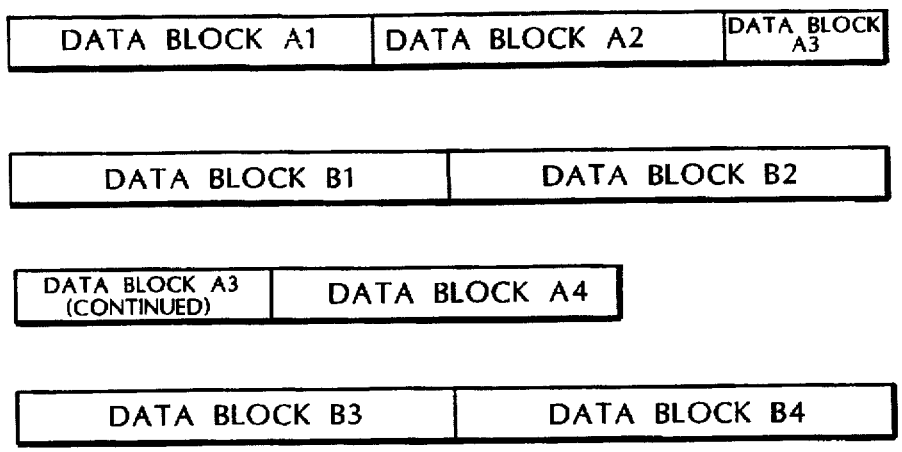
FIG. 2 is an illustrative diagrammatic representation of a sequence of frames in a data stream.

In accordance with the problems noted herein, and referring to FIG. 2, an intermixed transmission over a fibre channel can be received from two sources. The frames from data source A are labelled "Data Block A1", "Data Block A2", and so on. Similarly, the frames from data source B are labeled "Data Block B1", "Data Block B2", etc. According to the fibre channel protocol, the maximum amount of data that can be encapsulated in a single frame is 2112 bytes. If the frame size is not an integer multiple of the logical block size, or if the logical block size is greater than that of the frame, then a single logical block will likely be split between two (or more) frames. This is illustrated, for example, in FIG. 2 where data block A3 is split, the first portion of the logical block being delivered in frame 1, and the second portion or remainder of the logical block being delivered in frame 3. Since there exists an intermediate frame from another source (or a different datastream from the same source), in this instance data source B, the frames, as illustrated, can be interleaved, providing frames between, or substantially in the middle of, the two portions of an interrupted logical data block. When this happens, a method, according to the invention, provides for storing the intermediate LRC calculation so that an LRC for the split block can later be appended to the end of the completed logical block, after it has been fully received in a later frame.

The LRC itself is calculated on a running basis by EXCLUSIVE-OR'ing "words" formed from the incoming data. In the illustrated and preferred embodiment of the invention, four bytes of data form a "word" and the LRC is determined by successively EXCLUSIVE-OR'ing succeeding four byte groups of the block in succession.

In accordance with the invention, the fibre channel sequence management function of a disk controller 30, in the illustrated embodiment of the invention, utilizes contexts to monitor and track the process and progress of a virtually unlimited number of concurrent data streams, referred to in the fibre channel protocol as "sequences". A part of the sequence management function is to match a continuing (previously interrupted) sequence to the appropriate context. When a match occurs, a valid context is automatically loaded into the LRC calculation sequence chip and sequence processing continues under the protocol. Sequence context matching occurs for every frame, and if the currently loaded context does not match that of the newly received frame, the process referred to above retrieves the correct context from a context storage 32. Context storage, in accordance with the invention, includes a plurality of registers 34 which are dedicated to the LRC calculation function, and which are included as part of the context structure for the particular data stream being received.

Figure 3:
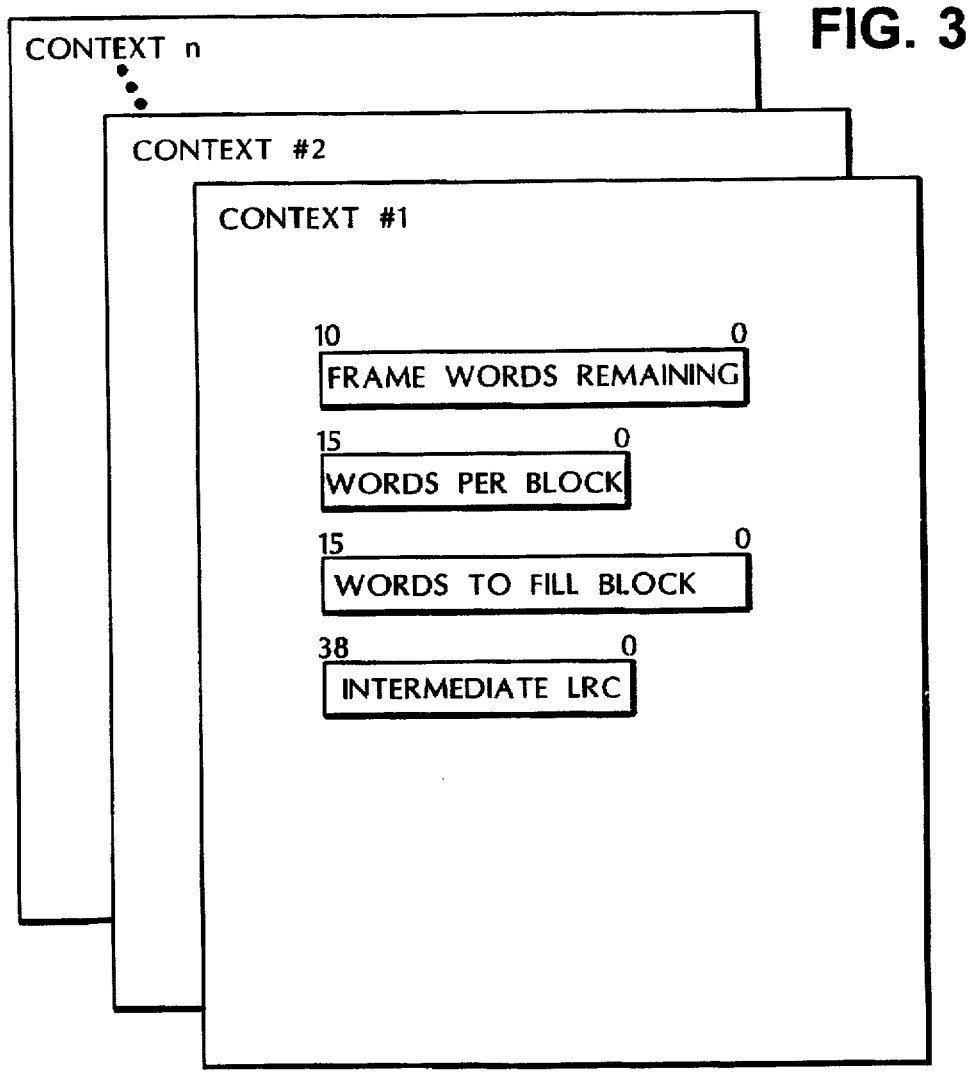
FIG. 3 is an illustrative diagrammatic representation of a portion of the context storage in accordance with the invention.

The fibre channel sequence management controller dedicates four registers, to track the LRC generation and checking. These registers, referring to FIG. 3, are designated to store the "Frame Words Remaining" which counts the number of 32 bit words left in the current frame, either to be received or transmitted; the "Words Per Block" which is programmed by the system software to indicate the logical block size which the system is using; the "Words to Fill Block" which counts the remaining number of words needed to completely fill the logical block being received or transmitted; and the "Intermediate LRC" which is used to store the interim result of the LRC calculation when a full logical block has not been received or transmitted and is interrupted. The first three registers are used by the method to determine where to insert the longitudinal redundancy check value when receiving data and where to check for the longitudinal redundancy check, appended to a block being transmitted, when transmitting data.

Figure 4:
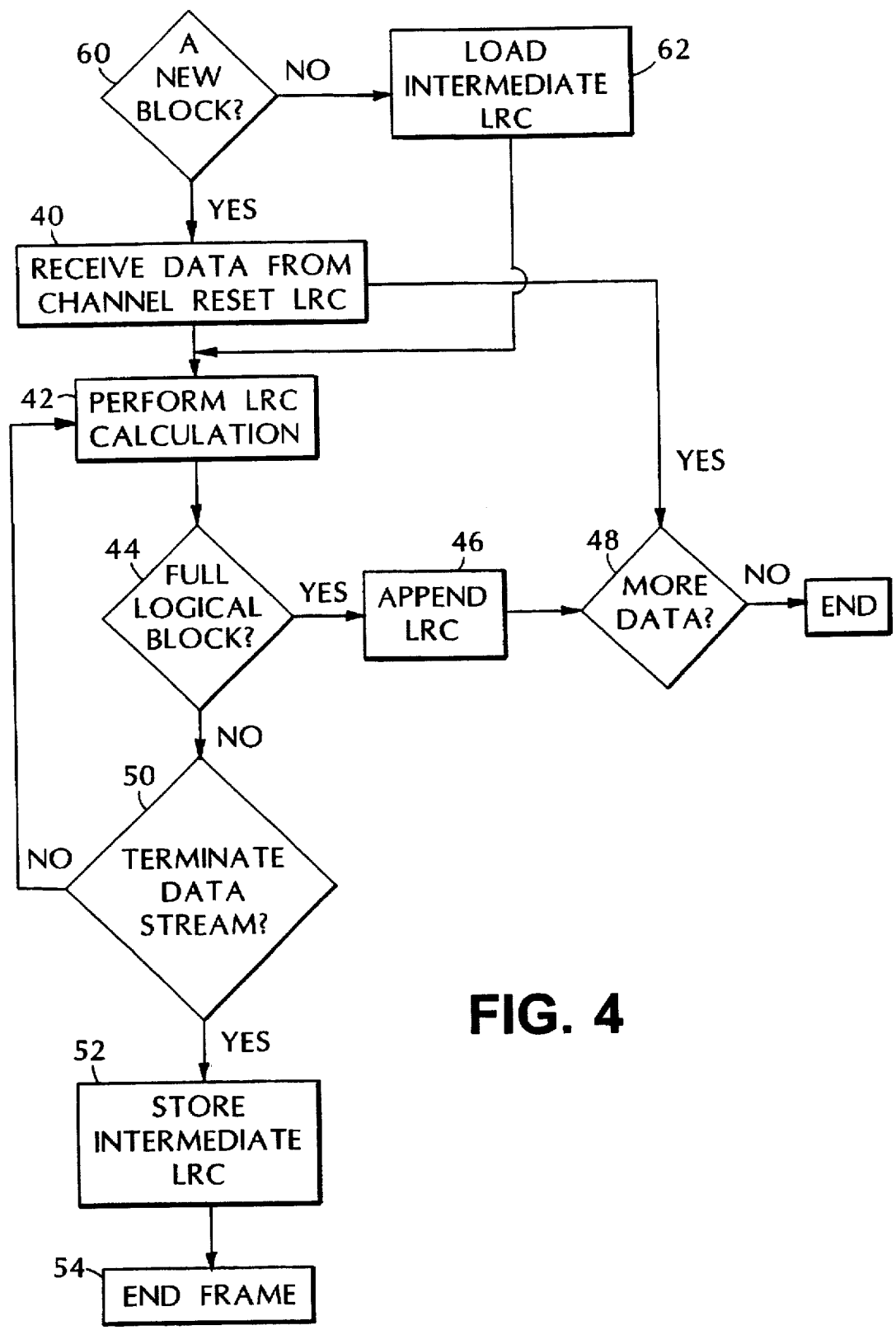
FIG. 4 is a flow chart of a write operation in accordance with an illustrated embodiment of the invention.

According to the method, referring to FIG. 4, as data frames are being received from the communications channel link for storage (at 40), the channel controller 30, a fiber channel controller in the illustrated embodiment of the invention, places the data into the system storage 20. As the data is being DMA'd into system memory 20, the longitudinal redundancy check calculation is being performed at 42) by circuitry 16. The result will be returned to the sequence manager of controller 30 upon completion. The sequence manager will use the "Frame Words Remaining", "Words per Block" and "Words to Fill Block" registers to track when the full logical block has been transferred into system memory (at 44) and then to indicate to the DMA engine of controller 30 to append to the end of the block the calculated longitudinal redundancy check (at 46). If the data stream terminates at that point, indicated at 48, the controller exits and awaits further data on its input line. Otherwise, the system loops back to receive more data from the channel and perform another LRC calculation.

If, at 44, there had not been a complete logical block, the controller next determines whether it must terminate the data stream. This is indicated at 50. If the data stream is not to be terminated, the system continues to perform the LRC calculation as additional data is received. If the data stream is terminated, then it is being terminated at other than the end of a logical block, in other words other than at a logical termination for the data stream. In that instance, the interim results of the calculated longitudinal redundancy check are stored along with the other required data in the context storage associated with that data stream. This is indicated at 52.

Since the interim results of the longitudinal redundancy check calculation are maintained as part of the context, when the DMA operation continues a stream of data, at 60, the controller first checks to determine whether this is the beginning of a new block. If it is not, for a given data block, that is, a block which has been split between two frames, the intermediate LRC value is passed, at 62, to the DMA engine from the context storage, for use in continuing the LRC calculation. Thus, the DMA engine will use the intermediate value of the LRC to complete the LRC calculation as the data corresponding to that logical block continues to be received. The passing of the LRC data back and forth between the sequence manager and the DMA engine of controller 30 allows, therefore, for a piece-wise reassembly of a split logical block. Also, since the intermediate LRC is stored with the context information, if other interim mixed data streams are received prior to the first (interrupted) data stream being resumed, the interim LRC value is once again still available so that the LRC calculations can be continued without penalty and without loss of either efficiency or information.

Figure 5:
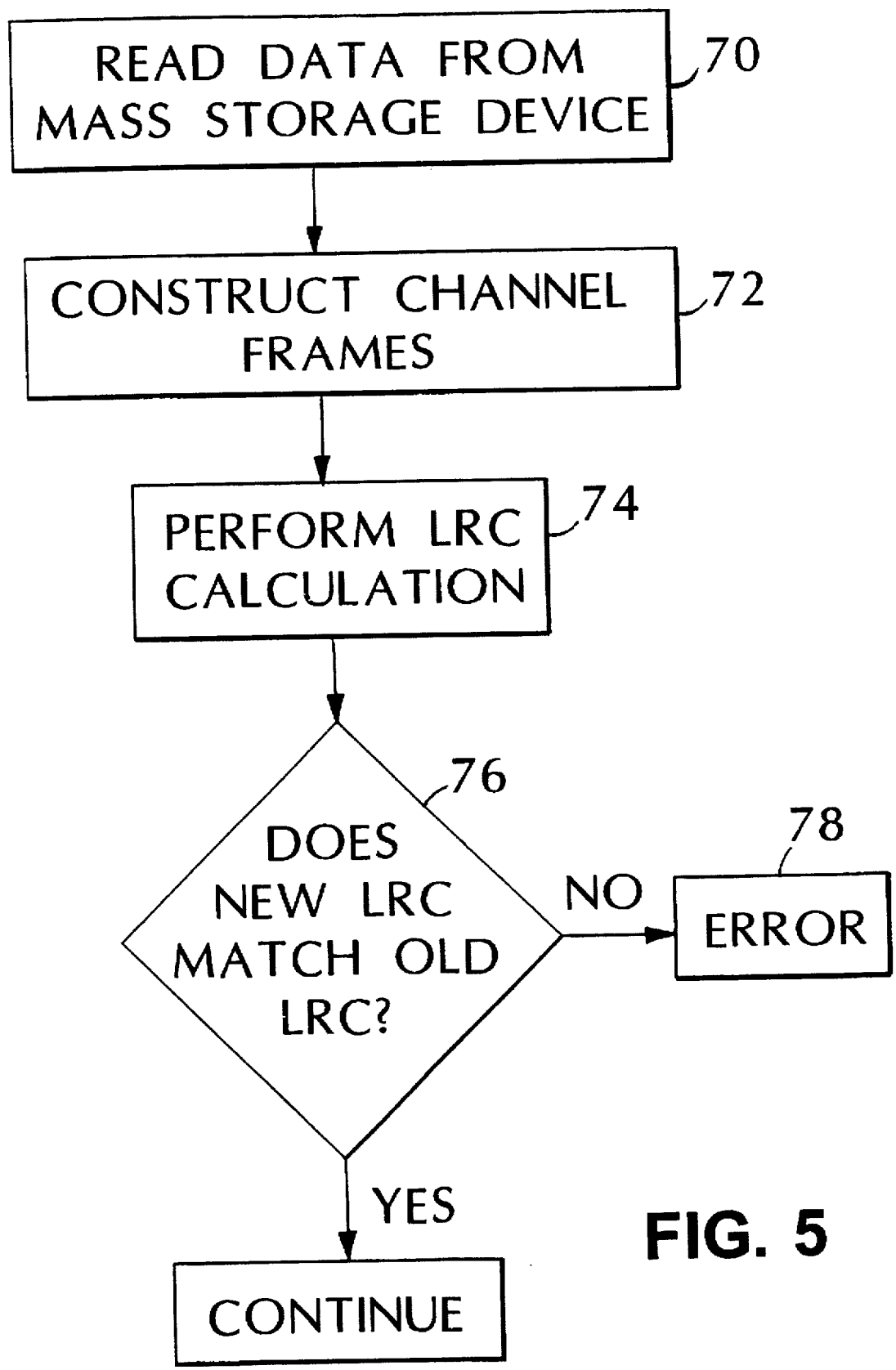
FIG. 5 is a flow chart illustrating the steps of a read operation in accordance with a preferred embodiment of the invention.

Referring to FIG. 5, as noted above, when data frames are prepared, at 70, for transmission from the storage media onto the communications link, the controller will take data from the system memory and construct valid channel frames at 72. With regard to the fiber channel, the frames of course must meet the fiber channel protocol. As the data is DMA'd from the system memory, the LRC calculation is again performed, at 74, and the result is returned to the sequence manager. The sequence manager, using the "Frame Words Remaining", "Words per Block" and "Words to Fill Block" registers to track when the full logical block has been transferred into the frame it is building, maintains complete control and information regarding the logical blocks and frames. When all of the data of the logical block has been transferred, the new LRC calculation is compared, at 76, against that which was stored with the original data. If there is a mismatch (at 78), data corruption may have occurred (although at times it may only be that the LRC calculations are incorrect) and the system processor is advised of the situation. Otherwise the reading operation continues. Since the LRC is contained as part of the context, intermixed transmit streams are also possible.

Accordingly, longitudinal redundancy checking in an intermixed environment, often ignored in previous systems, is implemented without need to "involve" any host CPU facilities unless there is an error. The alternative to this process requires that LRC protection be implemented at the application layer, that is, where knowledge of the data in terms of the logical block, and not in terms of frames, is known. To accomplish that end, the system processor must be involved in every data block to be transferred. This would degrade overall system performance. According to the present invention, the system processor is freed from any such involvement and the entire process is undertaken, using the context storage of the controller, in accordance with the invention. Accordingly, therefore, the LRC mechanism is employed to detect link-related errors, including for example, faulty DMA transfers within the system, corrupted data in the system memory, or software bugs.

Modifications of the described particular embodiment of the invention will be apparent to those practiced in the field and are within the scope of the following claims.

What is claimed is:

1. A method for checking data integrity in a data communications system in which plural data streams can be intermixed comprising the steps of:
   (a) receiving a first incoming data stream,
   (b) determining a running longitudinal redundancy check for said received data stream as it is being received,
   (c) storing an intermediate value of said longitudinal redundancy check, if said stream is interrupted at other than a logical termination of said stream, in a context storage associated only with said stream,
   (d) recognizing a continuation of said interrupted data stream,
   (e) recalling said intermediate value from said context storage associated with said interrupted data stream,
   (f) continuing to determine said running longitudinal redundancy check for said received data stream using said recalled intermediate value, and
   (g) repeating steps (c), (d), (e), and (f) if said received data stream is interrupted prior to said logical termination of said stream.

2. The method of claim 1 wherein
   said received data stream comprises a sequence of data blocks and the end of each data block is said logical termination of said data stream.

3. The method of claim 2 wherein
   said communications system uses a fibre channel protocol having a sequence of frames, and each frame consisting of a group of blocks, and comprising the step of
   terminating a data stream from a first source at the end of a frame, and
   wherein said storing step occurs if said data stream is terminated at other than the end of a block of said frame.

4. The method of claim 3 wherein said determining step comprises the step of
   EXCLUSIVE-OR'ing successive groups of data from said data stream.

5. The method of claim 3 wherein said storing step further includes
   storing with said intermediate value in said context storage, the number of frame words remaining in said frame, the number of words per block, and the number of words remaining to fill the current block.

6. The method of claim 3 further comprising the steps of comparing a determined longitudinal redundancy check at the end of the data stream with a previously determined longitudinal redundancy check for said data stream.

7. A method for checking data integrity in a fibre channel communications system in which plural data streams can be intermixed, each data stream having a sequence of data blocks and wherein communications of a complete data block is a logical termination of the data stream, said method comprising the steps of:

(a) receiving a first incoming data stream, (b) determining a running longitudinal redundancy check for said received data stream as it is being received, (c) storing an intermediate value of said longitudinal redundancy check, if said stream is interrupted at a frame boundary which is not a said logical termination of said stream, in a context storage associated only with said stream, (d) storing with said intermediate value in said context storage, the number of frame words remaining in said frame, the number of words per block, and the number of words remaining to fill the current block, (e) recognizing a continuation of said interrupted data stream, (f) recalling said intermediate value from said context storage associated with said interrupted data stream, (g) continuing to determine said running longitudinal redundancy check for said received data stream using said recalled intermediate redundancy value, and (h) repeating steps (c), (d), (e), (f), and (g), if said received data stream is interrupted prior to a said logical termination of said stream.

8. Apparatus for checking data integrity in a data communication system in which plural data streams can be intermixed comprising a data receiver for receiving a first incoming data stream, a data processor for determining a running longitudinal redundancy check for said received data stream as it is being received, a context storage associated with each said data stream for storing an intermediate value of said longitudinal redundancy check each time said stream is interrupted at other than a logical termination of said stream, said data processor recognizing each continuation of said interrupted data stream, and recalling said intermediate value from said context storage associated with said interrupted data stream, and said data processor determining said running longitudinal redundancy check for said continued received data stream using the last recalled intermediate value.

9. The apparatus of claim 8 wherein said received data stream comprises a sequence of data blocks and each complete data block is said logical termination of said data stream.

10. The apparatus of claim 9 wherein said communication system includes a fibre channel protocol having a sequence of frames, and each frame consists of a group of blocks, and comprising a processor for terminating a data stream from a first source at the end of a frame, and wherein said storage stores said intermediate value if said data stream terminates at other than the end of a block of a frame.

11. The apparatus of claim 10 wherein said data processor further comprises an EXCLUSIVE-OR circuit for EXCLUSIVE-OR'ing successive groups of data from said data stream to generate said longitudinal redundancy code.

12. The apparatus of claim 10 wherein said storage further comprises means for storing with said intermediate value, the number of frame words remaining in said frame, the number of words per block, and the number of words remaining to fill the current block.

13. The apparatus of claim 10 further comprising said processor comparing a determined longitudinal redundancy check at the end each block of the data stream with a previously determined longitudinal redundancy check for said block of said data stream.

14. Apparatus for checking data integrity in a fibre channel data communications system in which plural data streams can be intermixed, said channel operating according to a fibre channel protocol having a sequence of frames, and each frame consisting of a group of blocks, comprising a data receiver for receiving a first incoming data stream, a data processor for determining a running longitudinal redundancy check for said received data stream as it is being received, said processor having an EXCLUSIVE-OR circuit for EXCLUSIVE-OR'ing successive groups of data from said data stream to generate said longitudinal redundancy check, a context storage associated only with said stream for storing an intermediate value of said longitudinal redundancy check each time said stream is interrupted prior to a logical termination of said stream, said storage storing with said intermediate value, the number of frame words remaining in said frame, the number of words per block, and the number of words remaining to fill a current block, said data processor recognizing each continuation of said interrupted data stream, and recalling said intermediate value from said context storage associated with said interrupted data stream, and said data processor determining said running longitudinal redundancy check for said continued received data stream using the last recalled intermediate value.

* * * * *